Aug. 26, 1969  H. A. PAX  3,463,126
COMBUSTION EFFICIENCY OF ROTATING COMBUSTION ENGINES
Filed Nov. 14, 1967  3 Sheets-Sheet 1

INVENTOR.
HENRY A. PAX
BY
ATTORNEY

Aug. 26, 1969   H. A. PAX   3,463,126
COMBUSTION EFFICIENCY OF ROTATING COMBUSTION ENGINES
Filed Nov. 14, 1967   3 Sheets-Sheet 2

INVENTOR.
HENRY A. PAX
BY
ATTORNEY

United States Patent Office 3,463,126
Patented Aug. 26, 1969

3,463,126
COMBUSTION EFFICIENCY OF ROTATING COMBUSTION ENGINES
Henry A. Pax, 620 E. Third Ave.,
Roselle, N.J. 07203
Filed Nov. 14, 1967, Ser. No. 682,931
Int. Cl. F02b 53/00, 55/00
U.S. Cl. 123—8          7 Claims

ABSTRACT OF THE DISCLOSURE

In order to more completely burn the fuel-air charge in rotating combustion (RC) engines in less time, and thus improve their efficiency, the inner housing wall adjacent the spark plug is provided with a duct having an aft fuel-air mixture inlet port and a forward combustion mixture outlet port, through which the combustible mixture flows past the spark.

Additional inlet and outlet ports connecting with said duct (which desirably has a concave surface adjacent said spark) may be provided.

Background of the invention

Referring to the drawings, and first, particularly to FIG. 1, dealing with a conventional RC engine, numeral 10 indicates generally a metal housing having inner water-cooling channels 11, and end covers 12. At one side of housing 10 is mounted a carburetor 13 leading to inlet 14 for feeding the fuel-air mixture into the combustion chamber 15. The inner surface 16 of the housing is in the shape of an epitrochoid. Each engine has a triangular rotor 17, and its outer surface approximates the inner envelope 16 during the relative rotation of the rotor. The apexes or edges 18 of the rotor are in sealing contact with the epitrochoid 16 at all times. A spark plug 19 projects into opening 20 in the surface 16, and serves to ignite the fuel air mixture when the rotor is in the ignition position. Rotor 17 has a centrally-disposed inner cavity 21, the periphery of which is provided with inner gears 22. Within this cavity is disposed the inner rotor 23 having external gears 24 which mesh with gears 22. Rotor 23 is attached to shaft 25 which serves to drive the vehicle in which the engine is mounted. An exhaust 26 is provided for discharge of the burned gases.

As shown in FIG. 2, the fuel-air mixture is drawn in when the rotor is in the intake position. Then, as the rotor turns, the mixture is compressed, due to the epitrochoid shape of the inner wall 16. When the gases are fully compressed, the spark plug 19 is fired, whereupon, due to the combustion, an expansion takes place, which is the power impulse. Thereafter, the gases are discharged through the exhaust.

The fresh gas mixture travels in "pockets" between the rotor-rim segments and the trochoidal surface 16. When the pocket widens during the power phase, the gases spread almost to the next apex with incredible speed. This extremely high gas-transfer velocity appears to be particularly peculiar to RC engines. As in the case of a piston engine, the combustion spreads with a flame front. However, in a low turbulence combustion chamber, as in piston engines, the flame front would advance from the spark like ripples from a brick dropped in a pool of water. However, in an RC engine, the flame front surprisingly cannot keep up with the gas transfer. One would expect that the gases ignited first would ride the crest of the gas-transfer wave, thus speeding up the advance of the flame front. This, however, is not the case, and the flame front generally does not catch up with all of the combustible gas mixture. As a result, the engine tends to leave some unburned gas at the end of the power phase.

One well known RC engine is the Wankel engine, which is described in "Curtiss-Wright's Experimental Rotating Combustion Engines—A New Shape in Power" by M. Bentele of Curtiss-Wright Corporation, Wood-Ridge, N.J. Further descriptions on such aircraft engines are given in the paper by C. Jones at the SAE Meeting, Farmingdale, N.J., Nov. 3, 1966, and at the Cleveland meeting on Oct. 18–21, 1965. Descriptions of similar engines also may be found in Boating, August 1966, Popular Science, April 1966, page 98, and in the booklet on the NSU Spider automobile.

Summary of the invention

According to the present invention, RC engine performance and efficiency are improved by burning the fuel-air charge more completely, in less time, and earlier in the power phase. This is accomplished by providing ducting means within the housing surface, in the spark plug area, wherein after initial ignition, the burning fuel-gas mixture is forced as jets into the main combustion chamber, so that the flame propagation takes place at more than a single point. The jet action increases the speed of the flame front, especially to the areas where combustion is normally late or slow. The jet action further assists in the gas transfer and gives a more even pressure loading to the rotor face.

An additional benefit of the jet action is that it effects a good mixing action during combustion which causes a more rapid and complete burning of the charge.

Brief description of the drawings

The invention will be more readily understood by reference to the accompanying drawings, in which a preferred embodiment is described, and in which.

The same numerals represent similar parts in the various figures.

Description of the preferred embodiments

Figure 3:
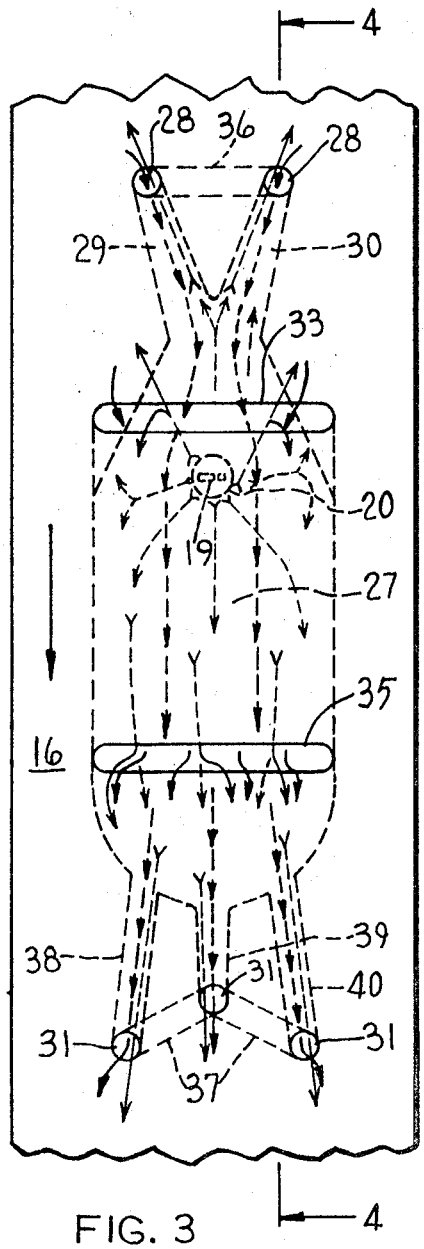
FIGURE 3 shows a side elevational view, taken along the plane of line 3—3 of FIGURE 2 of the housing wall showing features of the present invention.
Figure 4:
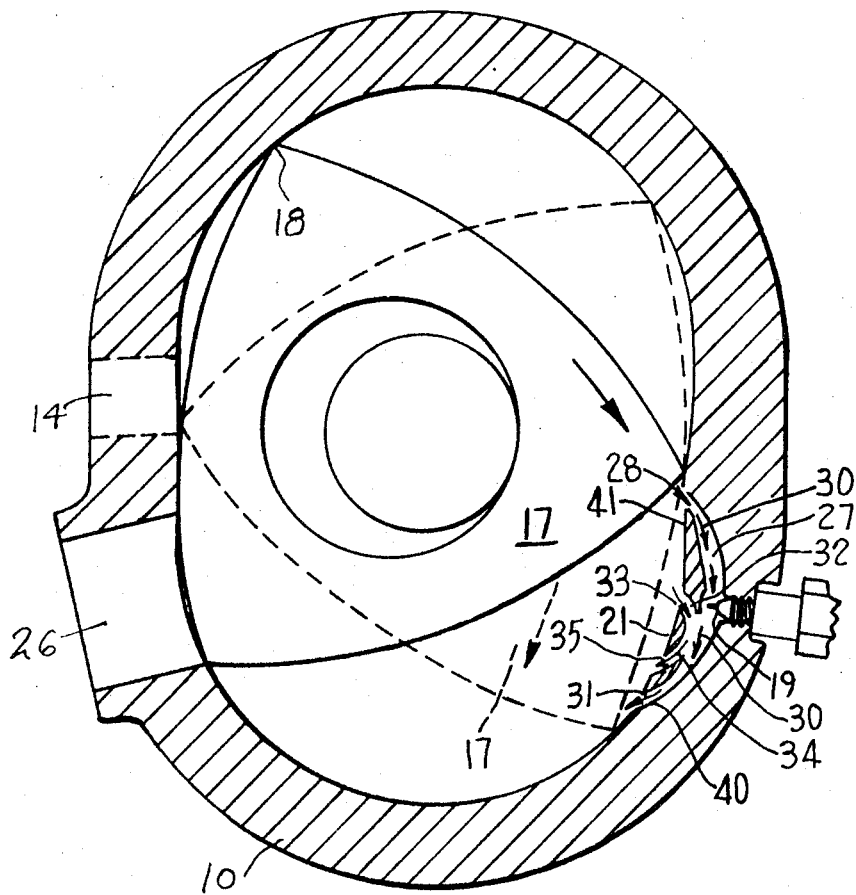
FIGURE 4 presents a cross-sectional side view of the entire housing wall (minus the water cooling ducts) taken along the plane of line 4—4 in FIGURE 3.

As is seen from FIG. 4, a duct 27 of arcuate concave design is cut or preferably molded into the housing so that spark plug 19 is about midway of the duct. The combustible gas, then, enters ports 28 (FIG. 3), for example, and flows through aft connecting channels 29 and 30, past spark 19 as the ignited mixture expands on combustion, the rapid pressure rise causes a reverse flow in ducts 29–30 and flame ejection from ports 28. Also, this rapid pressure rise would greatly increase the velocity of the gases through duct 27, and through forward connecting channels 38, 39 and 40, resulting in flame ejection from ports 31 at speeds approximating gun muzzle velocities. The flow of gases from ports 28 and 31 is directed toward the corners of the main combustion chamber where combustion is normally late and where detonation may occur in the pocketed gases. The ducts for ports 28 and 31 are convergent to eject the gases at greater velocity. The flow of the burning gases resulting from the combustion, is shown in FIG. 3 by the V-tailed or headed arrows. During the gas charging phase, the divergence of ducts 29 and 30 causes a deceleration of the incoming gas flow through ports 28 which will give them a better counterclockwise location and allow earlier loading of the ignition chamber without loss of unburned gases through the chamber exits. Also, this cartridge type "necking" would impart higher speed to the reverse flow gases during early combustion.

The combustion can be further improved by providing another connecting channel 32 (FIG. 4) adjacent the spark plug, and arcuately shaped, so that additional combustible gases entering port 33 (which is the entrance to channel 32) may be directed in jet effect, in the direction of the arrows, to the discharge ports. Also, an additional exit channel 34 (FIG. 4) may be provided past the spark, in rotor movement forward relation with respect to channel 32, so that burned gases passing out of port 35, which connects with channel 34, would be in the form of a high speed jet, and in the direction of engine rotation.

As rotor 17 continues to rotate, the intake port 28, and later, port 33, of the ignition chamber 30 are vented to the compression phase, and there is a flow of fresh combustible charge through the ignition chamber. The flow enters into duct 30, via ports 28 and 33, and the flow exits out of ports 35 and 31.

Figure 1:
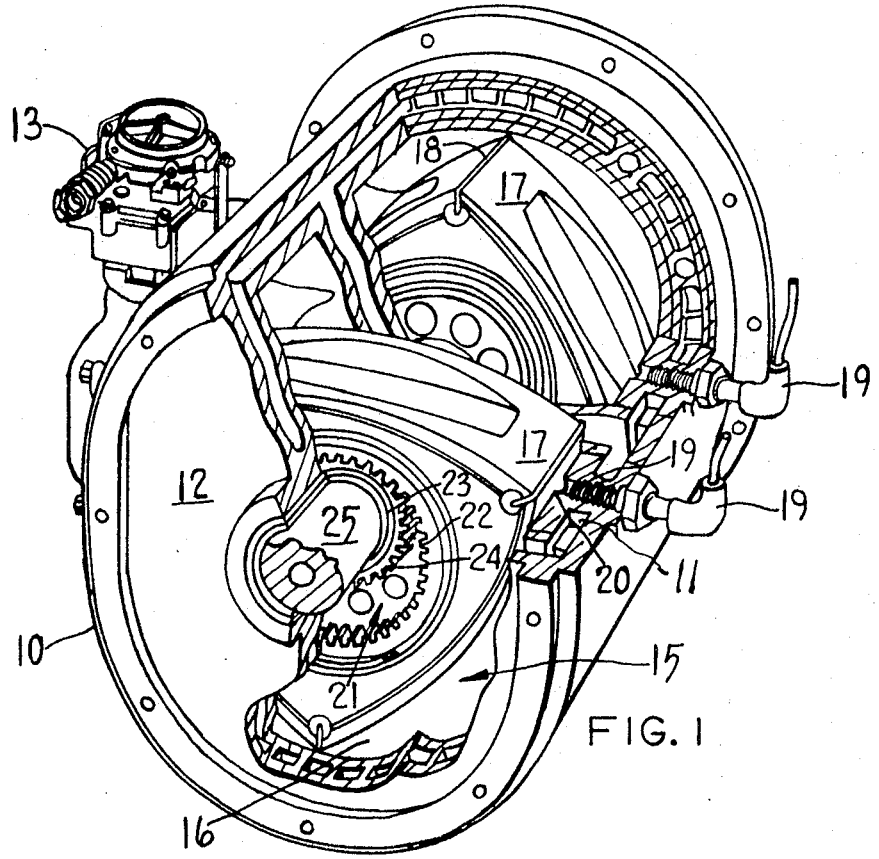
FIGURE 1 depicts a perspective front view, with housing partly cut away, of a conventional RC dual engine.
Figure 2:
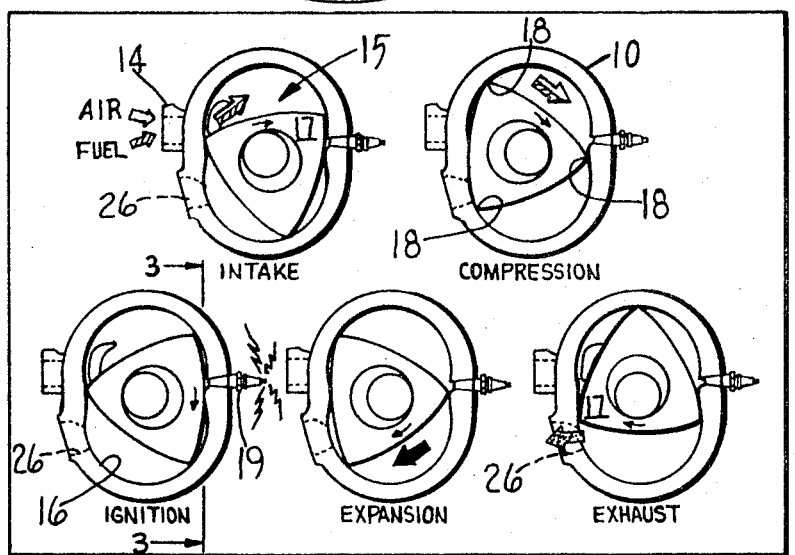
FIGURE 2 illustrates schematically front elevational views of the combustion cycle positions of the rotor of a single RC engine.

As rotation continues, ports 35 and 31 are passed by the rotor apex 18, so that the ignition chamber is completely within in the compression phase. The scavenging and recharging of the ignition chamber 30 is effected by the differential pressure between the exhausting and the compression phases (FIG. 2).

The design of the ignition chamber and the baffles or channels associated therewith are such that practically no unburned charge passes ports 35 and 31 before rotor edge 18 passes these points, although, from a practical point of view, some exhaust gas would be trapped in the ignition chamber. Even after the rotor edge 18 passes ports 35 and 31, the gas flow in the ignition chamber 30 continues in the same direction, so that, when ignition occurs, the entire ignition chamber is filled with a fresh charge of combustible gas.

After ignition of the charge, there is a rapid build-up of pressure in the ignition chamber. This pressure is sufficiently rapid and of a degree sufficient to force jets of flame from all ports of the ignition chamber. The speed of the gases ejected from ports 31–35 is very high due to the effect of the pressure increase, as well as the initial direction and velocity of the gas flow. A reversal of gas flow at this time takes place through ports 28 and 33, while combustion takes place in ignition chamber 30. The speed of the flame front during the combustion is considerably increased by the velocity of the gases ejected through the ports. Also, the gases become ignited at a number of locations. The jet action from the ports provides excellent mixing of the burning gases during the combustion, thereby insuring very complete combustion at an early stage of the power phase. The aforesaid factors greatly decrease the probability of detonation. Furthermore, the decreasing of the time required to burn the charge would allow an increase of the compression ratio. It would also allow an increase in the apex velocity of the rotor either by a higher r.p.m. or a larger diameter rotor.

It is desirable to locate the spark plug 19 at the center, or better still, somewhat in advance of the center of ignition chamber 30–30′, and the arrangement results in very complete scavenging of the exhaust gases in the ignition area. Since this scavenging would be more complete than with present conventional RC engines, it is possible to employ a leaner mixture for combustion.

Although improvement in the aforesaid respect over conventional engines can be realized by one series of inlets 28 and one series of outlets 35 or 31, much better results can be obtained when a multiplicity of inlet ports and outlet ports are employed, as in FIGS. 3–4. Instead of two inlet ports 28, it is possible to employ only one inlet port 36 (FIG. 3). Likewise, instead of the multiple discharge ports 31, one, may employ a single exit port 37. It will be noted, from FIG. 3, that the gas discharge from ignition space 27 may take place through a multiplicity of narrow channels 38, 39 and 40, in which case the speed of the gases is greatly increased.

With the aforesaid invention, it is possible to obtain better specific fuel consumption, since the more rapid burning of the charge converts more of the latent energy of the fuel into useful power. For best fuel performance, the fuel charge should be completely burned at a very early stage of the power phase.

Also, by means of the present invention, more power is possible, especially at higher r.p.m.'s than with conventional RC engines. It is apparent that the dimensions of the ignition chamber, the ducts and the vents may be designed for any burning speed, and, if desired additional ports may be added when a larger diameter or wider rotor is employed.

Another beneficial feature of the present invention resides in the fact that there would be less air pollution in the operation of the engine, since the charge would be burned more completely and with a leaner mixture.

The present invention also is applicable for Diesel, or fuel injection type engines, wherein the spark plug may be employed for initiating the cycle after which ignition would take place at the time of fuel injection in the ignition chamber.

As pre-ignition is no factor in fuel injection engines, and there is no lubrication and no movable parts are associated with the ignition chamber, the ignition chamber could be allowed to become as hot as the properties of the structural metals will allow. This probably would allow the incorporation of insulation to decrease the transfer of heat toward the rotor and possibly in the outer walls as well.

The ignition chamber for the fuel injection engine would be of larger size so that almost all of the charge would pass through the ignition chamber. The ignition chamber would probably be more appropriately called a combustion chamber, as most, if not all, of the combustion would occur in this chamber. The volumetric efficiency of this engine would be decreased slightly as some air would not pass through the combustion chamber. This air would have a desirable heat-shielding effect on the rotor, especially in the seal areas.

I claim:
1. In a rotating combustion engine, of the type described, and designed to burn a fuel-air combustible mixture, and having an inner epitrochoidally-shaped housing surface and having a triangular rotor disposed within said housing, the apex edges of said rotor being continually in sealing contact with said epitrochiodal surface, and having sparking means disposed in said housing, the improvement comprising:
   ducting means disposed beneath the inner housing surface in substantially paralled relation thereto and adjacent said sparking means, and through which said combustible mixture is designed to flow during the ignition phase of said engine, while said ducting means is enclosed between two rotor edges thereof,
   means forming at least one inlet port opening in said epitrochoidal surface connecting with the aft end of said ducting means,
   means forming at least one outlet port opening in said epitrochoidal surface connecting with the forward end of said ducting means, and
   said sparking means being disposed in or near said ducting means and designed to ignite said combustible mixture passing therethrough.

2. A rotating combustion engine, according to claim 1, in which at least one additional inlet port opening is disposed in said epitrochoidal surface in connecting relation to an intermediate section of said ducting means.

3. A rotating combustion engine, according to claim 1, in which at least one additional outlet port opening is disposed in said epitrochoidal surface aft of said one outlet port opening in connecting relation to an intermediate section of said ducting means.

4. A rotating combustion engine, according to claim 2, in which a second outlet port opening is disposed in said epitrochoidal surface between said second inlet port opening and said one outlet port opening and in connecting relation with an intermediate section of said ducting means.

5. A rotating combustion engine, according to claim 4, in which said sparking means is disposed in or near the center of said ducting means.

6. A rotating combustion engine, according to claim 1, in which said ducting means is concavely-shaped with respect to said epitrochoidal surface.

7. A rotating combustion engine, according to claim 6, in which said inlet ports and said outlet ports are arcuately-connected with said ducting means.

References Cited

UNITED STATES PATENTS 3,200,795    8/1965    Meurer.

FOREIGN PATENTS 1,369,311    7/1964    France.

C. J. HUSAR, Primary Examiner

U.S. Cl. X.R.

230—145